Oct. 13, 1931.   G. H. TOWNSEND ET AL   1,826,968
ACCELERATOR AND FOOT REST
Filed July 19, 1929   5 Sheets-Sheet 3

George Hewlett Townsend
and Cord H. Behnke.
INVENTOR

BY Moses & Nolte
ATTORNEYS

Oct. 13, 1931.    G. H. TOWNSEND ET AL    1,826,968
ACCELERATOR AND FOOT REST
Filed July 19, 1929    5 Sheets-Sheet 5

George Hewlett Townsend
and Cord H. Behnke.
INVENTOR

BY Moses + Nolte
ATTORNEYS

Patented Oct. 13, 1931

1,826,968

UNITED STATES PATENT OFFICE

GEORGE HEWLETT TOWNSEND AND CORD H. BEHNKE, OF FLUSHING, NEW YORK

ACCELERATOR AND FOOT REST

Application filed July 19, 1929. Serial No. 379,382.

This invention relates to control devices for motor driven machines adapted to be operated at various speeds, the invention being illustrated and described herein in connection with the use for which it is primarily designed, namely, for controlling the throttle of a motor vehicle. It should be understood, however, that the invention is not limited to such illustrative use, and that it is contemplated that it will be used for other purposes, such, for example, as controlling the motor of an electrically driven sewing machine.

In controlling a motor vehicle by means of the usual commercially known foot accelerators, the operator is required to keep his foot for long periods as nearly as possible in a uniform position in order that the fuel may be fed uniformly to the motor. This is fatiguing even under the most favorable conditions, since the accelerator affords no substantial support for the foot and the foot must, therefore, be held poised in operative relation to the accelerator. The desired uniform feeding of the fuel is ordinarily impossible of realization, moreover, because of the inequalities of the road which jar the operator's foot and cause him suddenly to change the amount of fuel being fed to the motor. Such sudden changes in the rate of fuel feed are disagreeable and fatiguing to all the occupants of the vehicle, and are productive of objectionable strain and wear in the parts of the vehicle.

It is an object of the present invention to provide a control pedal which, while normally responsive in the usual way to control by the operator, may be locked against depression in any desired position by a very slight shifting of the weight of the foot to apply a light force to a locking member carried by the pedal.

The present invention is in the nature of an improvement upon the invention disclosed in the pending application of George Hewlett Townsend, Serial No. 255,252, filed February 18, 1928, for accelerators, and is a continuation in part of a pending application of George Hewlett Townsend and Cord H. Behnke, Serial No. 333,616, filed January 19, 1929, for accelerator and foot rest.

The present invention has for an object to provide a structure which is simple and cheap to manufacture and to apply to the various types of accelerator mechanisms now in use, which is capable of precise and certain operation and release, and which cannot rattle.

Other objects and advantages will hereinafter appear.

In the drawings forming part of this specification.

The pedal embodying the present invention is designed to be applicable to various existing automobiles for replacing the accelerator pedal or button forming a standard part of the automobile. This pedal attachment comprises a base 1 adapted to be screwed to the floor board 2 of a motor vehicle. The base 1 has upstanding ears 3 struck therefrom which support a hinge pin 4 for pivotally mounting a pedal 5. The pedal 5 comprises a plate 6 which has a depressed portion 7 in its upper face and slots 8 and 9 along the side and forward extremities of the depressed portion. A plate 10 is positioned in the recess formed by the depressed portion 7 and is provided with downturned ears 11 and 12 which extend respectively through the slots 8 and 9. The ears 11 are impaled upon the hinge pin 4 and constitute the bearing members for the pedal. The plate 10 is secured to the depressed portion 7 of the plate 6 by rivets which also extend through a bracket 13 situated below the depressed portion 7 of the plate 6. The bracket 13 extends downwardly to the rear of the hinge pin 4, and thence rearwardly. In this rearwardly extending portion of the bracket a stop screw 14 is threaded for limiting upward movement of the main body of the pedal. This screw may be made accessible through an opening 15 in the plate 6. Provision is also made of a lock nut 16 for securing the screw 14 in adjusted position.

The plate 6 in the embodiment of Figures 1 to 13, inclusive, overlies an accelerator rod 17 which extends through the floor board 2 and is connected in the usual manner through a suitable operating train to control the throttle of the vehicle. A spring 18 tends to raise the rod 17 to close the throttle and the rod is depressed by foot pressure applied to the pedal 5 to open the throttle. As thus far described the pedal would be effective in the usual manner as a mere operator of the accelerator rod 17.

Figures 1, 2, 3, 4:
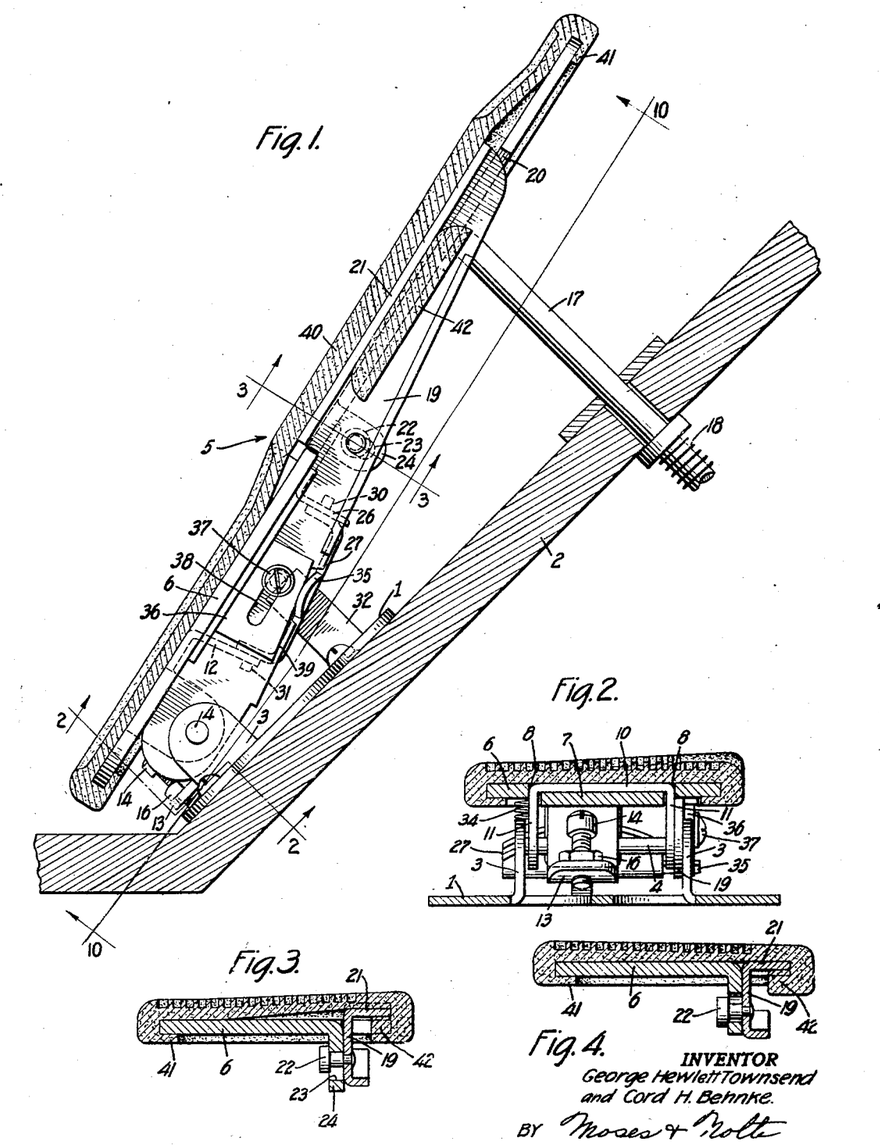
Figure 1 is a sectional, side elevation through the floor board of a motor vehicle and through an accelerator pedal which is applied thereto and which embodies features of the invention.
Figure 2 is a transverse, sectional elevation on the line 2—2 of Figure 1, looking in the direction of the arrows.
Figure 3 is a transverse, sectional elevation on the line 3—3 of Figure 1, looking in the direction of the arrows.
Figure 4 is a view similar to Figure 3, but showing the member for locking the pedal against depression operated to pedal locking position.

Provision is further made, however, of means for enabling the pedal to be locked against depression so that the pedal may be used as a foot rest when desired, either to relieve the foot of the operator of fatigue or to enable him to maintain an even fuel supply when running over rough roads. To this end provision is made of a locking bar 19 pivotally mounted upon the hinge pin 4 between the right hand ear 3 of the base 1 and the right hand ear 11 of the plate 10. This locking bar 19 extends upward through a cut away portion 20 of the plate 6, and is provided with a horizontal flange 21 which normally lies a little above the plane of the plate 6, as seen in Figures 1 and 3. A headed guide pin 22 is secured to the locking bar and extends through a slot 23 of a downturned flange 24 of the plate 6 for preventing substantial lateral movement of the locking bar 19. The locking bar 19 is provided with a horizontal flange 25 which engages the underside of the plate 6 and limits upward movement of the locking bar relative to the plate 6.

Figures 5, 6, 7, 8:
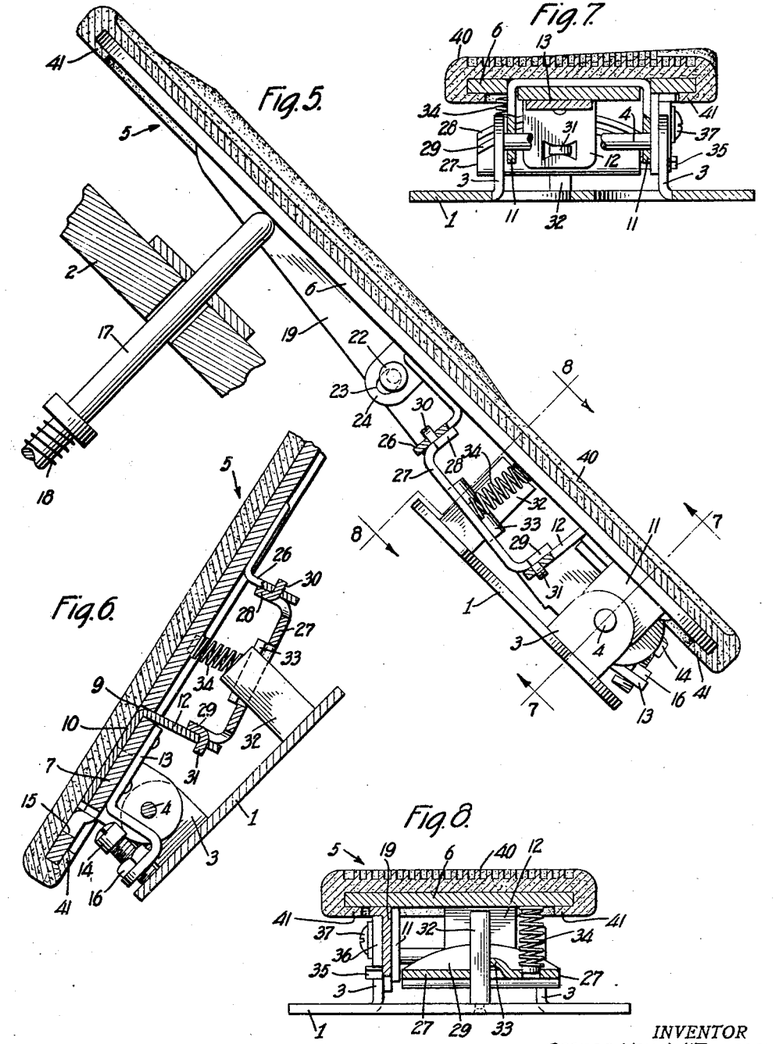
Figure 5 is a longitudinal, sectional elevation, the view being taken in the opposite direction from Figure 1.
Figure 6 is a fragmentary, sectional view taken approximately along the longitudinal center of the pedal.
Figure 7 is a transverse, sectional view on the line 7—7 of Figure 5, looking in the direction of the arrows.
Figure 8 is a transverse, sectional view taken on the line 8—8 of Figure 5, looking in the direction of the arrows.
Figure 9:
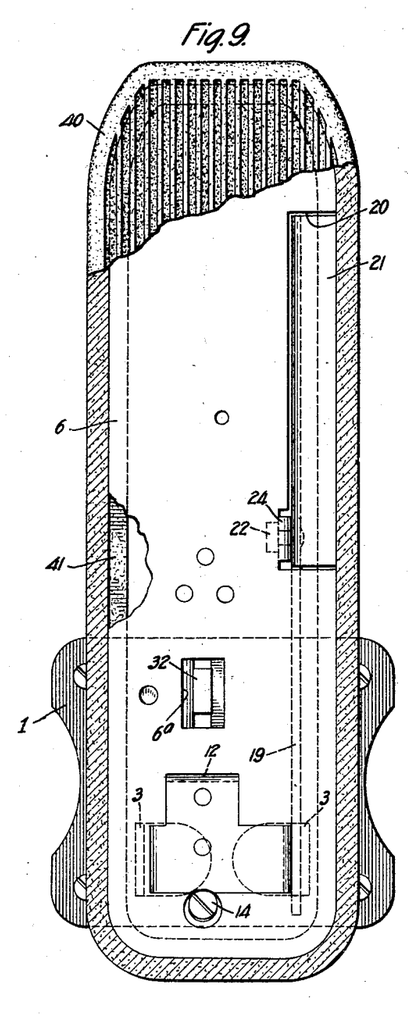
Figure 9 is a plan view, partly broken away, of the pedal shown in the preceding figures.
Figure 10:
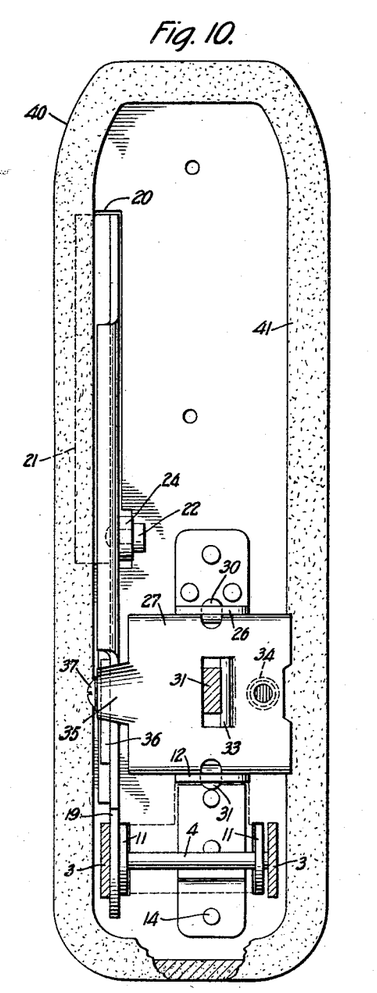
Figure 10 is a sectional view of the same pedal as seen from below, the section being taken on the line 10—10 of Figure 1, looking in the direction of the arrows.
Figure 11:
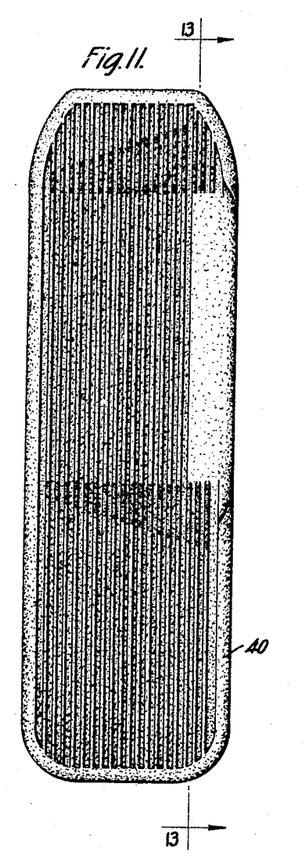
Figure 11 is a plan view of the pedal cover.
Figure 12:
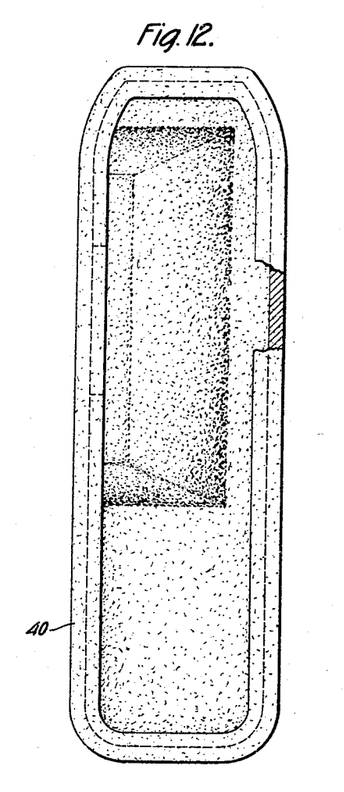
Figure 12 is a bottom plan view of the same, partly broken away.
Figure 13:
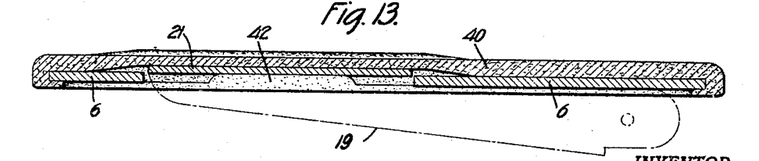
Figure 13 is a longitudinal, sectional view showing details of the construction of the pedal cover and its association with the pedal, the section being taken on the line 13—13 of Figure 11, looking in the direction of the arrows.

The plate 6 is provided with a depending bracket 26 which, in conjunction with the ear 12 of plate 10, forms a support for a friction plate 27. The friction plate 27 has its front and rear ends 28 and 29 upturned, and supporting lugs 30 and 31 are struck forwardly and rearwardly, respectively, from the ends 28 and 29 to extend through the bracket 26 and the ear 12. The supporting lugs 30 and 31 are received between convex surfaces of the bracket 26 and ear 12 which provide for limited lateral tilting of the friction plate 27. A friction post 32 carried by the base 1 extends upward through the friction plate 27 and is adapted to be gripped by rocking of the plate 27 in one direction and to be released by rocking of the plate in the opposite direction. As best seen in Figures 5, 6 and 8 the plate 27 is provided with an upwardly offset portion 33 at the left of the friction post 32. Rocking of the plate 27 toward the right is, therefore, effective to bind the plate 27 firmly against the post 32 and prevent movement of the pedal. A coil spring 34 is interposed under compression between the plate 27 and the plate 6 at the left of the pivot formed by the lugs 30, 31 and tends normally to maintain the plate 27 rocked to the left hand limit of its movement, so that the pedal is entirely free in its movements. When it is desired to lock the pedal, however, in any position which it may have reached, it is only necessary for the operator to rock his foot slightly to apply pressure to the flange 21 of locking bar 19. This depresses the flange 21 to the level of the plate 6 and causes the locking bar to press downward against an ear 35 on the plate 27 and thereby to rock the plate 27 to the right and into firm locking engagement with the friction post 32. The pedal may now be used as a foot rest so long as sufficient pressure is maintained upon the flange of the locking bar to maintain this binding relation. As soon as the pressure upon the locking bar is released, however, the spring 34 acts to rock the plate 27 again to the left and releases the pedal for further movement either in a downward direction by the foot or in an upward direction by the spring 18.

It is a feature of the invention that the locking effected by the plate 27 and the friction post affords sufficient opposition to depression of the pedal to enable the pedal to remain stationary when simply the weight of the foot and leg or such pressure as is ordinarily applied for producing acceleration is borne by the locking bar, but that the locking thus effected is purely frictional and that the parts are so arranged that in case of necessity the operator may force the pedal down even though the major portion of the pressure or all the pressure is applied directly to the locking bar. Such provision is important, for example, when a collision seems imminent, and it is necessary to accelerate the car quickly in order to get out of the way of another vehicle. Under such circumstances the operator may not have time, or may not think, to place his foot properly for easy acceleration, but he will naturally be inclined to apply more than the normal amount of force to the pedal. As a result, normal acceleration may be secured, even though the foot is hastily placed in the wrong position on the pedal for securing acceleration.

In order that the parts may be nicely adjusted and that the locking bar may be certain to become fully effective in the limited range of movement allowed it, provision is made on the locking bar of an adjustable wedge-shaped plate 36 for engaging the ear 35 of the plate 27. This plate 36 lies flat against the locking bar 19 and is secured thereto by a screw 37. The plate 36 is provided with a longitudinal slot 38 through which the screw passes. Because of the fact that the plate is wedge-shaped or in other words that the lower edge 39 of the plate is inclined with reference to the lower edge of the flange 25 of the locking bar, longitudinal adjustment of the plate 36 is effective to cause the locking bar to become effective at any point desired in the operation thereof to rock the plate 27 to locking position.

It is important that the parts be so constructed and combined that the portion of the pedal which engages the accelerator rod may have as long a stroke as is required for the full actuation of the rod, so that when the pedal is in its highest position the motor may be throttled down to idling speed, and when the pedal is in its lowest position it may fully depress the rod to produce the maximum feeding of fuel. To this end it is a point that the friction post is mounted between the pedal pivot and the accelerator rod, and that it is located somewhat nearer to the pivot than to the accelerator rod. When thus located, the friction post is of less height than the upper surface of the portion of the pedal plate 6 adjacent the pivot, while the distance from the pedal plate 6 to the bottom of the friction plate 27 is less than the height of the portion of the pedal plate 6 adjacent the pivot, above the base 1. The position of the friction post is preferably so selected that the maximum attainable relative movement of the plate 27 and the post is secured, consistent with maintaining the pivoted portion of the plate 6 at a conveniently moderate height, and with the securement of cooperative relationship of the plate and post in all positions.

An opening 6a is desirably provided in the pedal plate 6 to provide clearance for the top of the friction post when the pedal is fully depressed. With the arrangement as described the pedal plate 6 may be depressed until its forward end touches or substantially touches the floor board. The friction plate 27 is located at such a height and disposed at such an angle that it engages the base throughout its entire length simultaneously and serves to arrest the depression of the pedal without being subjected to any localized strain tending to produce distortion or breakage.

For the purpose of making the entire pedal assembly attractive in appearance and comfortable to the foot, and for the further purpose of preventing rattling of the locking bar, provision is made of a rubber cover 40 which covers all of the plate 6 and of the flange 21 of the locking bar 19. This rubber cover 40 is provided with an inturned flange 41 that extends around the margin of the cover 40 and snugly fits against the lower face of the plate 6. At the portion where the plate 6 is cut away the flange 41 extends beneath the flange 21 of the locking bar 19 and is provided with a thickened portion 42 for engaging the flange 21 in its elevated position. Due to the resiliency of the rubber this thickened portion of the flange 41 assists in urging the flange 21 to its uppermost position, and thus assists in preventing rattling of the locking bar. The upper surface of the cover 40 slopes smoothly upward at a very slight inclination from the portion overlying the plate 6 to the portion overlying the flange 21, so that the pedal as a whole does not differ substantially in appearance from a pedal of ordinary construction lacking the locking feature.

The rubber cover affords an opportunity for the operator to adjust the surface of the pedal to suit his own taste and convenience. By interposing a little wadding, such as paper or cotton, between the cover and the plate 6, any portion of the cover may, if desired, be elevated up to or even above the level of the cover portion which overlies the flange 21.

It should be noted that the resistance to depression of the pedal is purely frictional and that in case of necessity the operator may depress the pedal even against the resistance of the locking mechanism. The frictional resistance to depression is, however, more than ample to support the weight of the foot and leg in comfort.

Figures 14, 15, 16, 17:
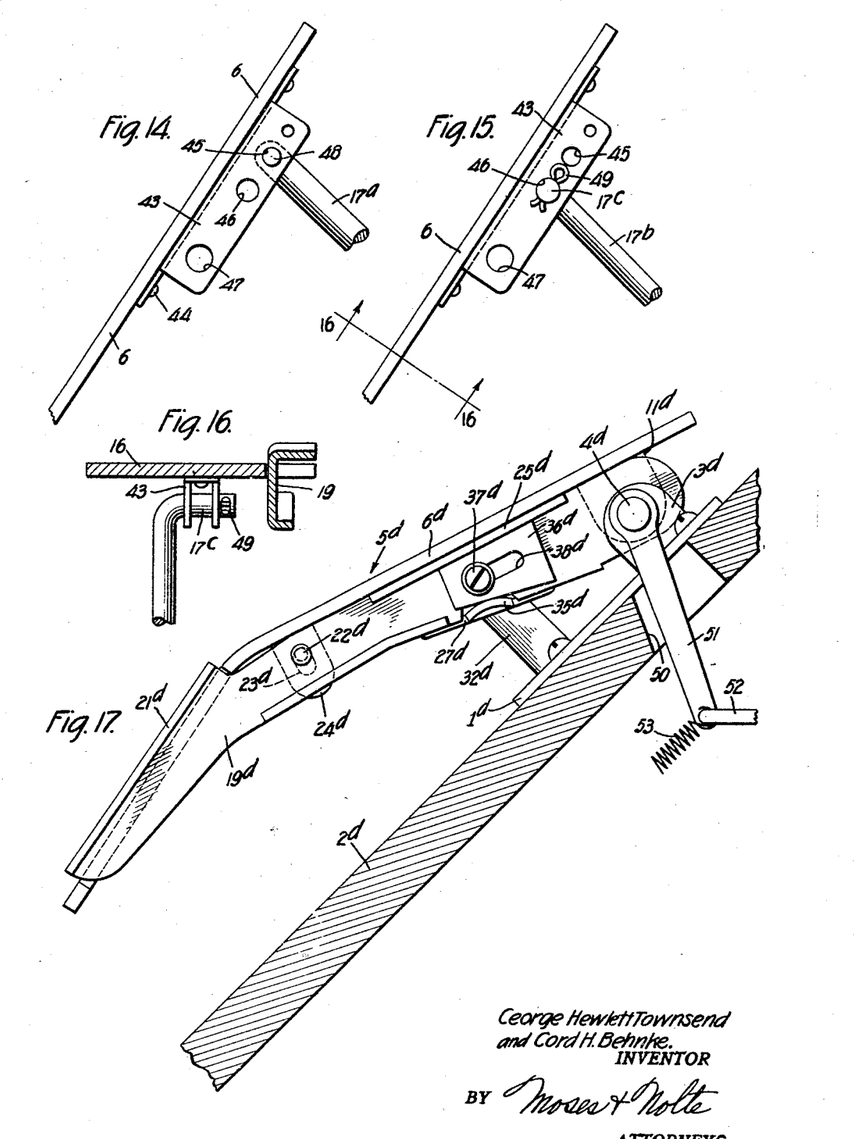
Figure 14 illustrates a fragment of the pedal and the association thereof with a different type of accelerator rod.
Figure 15 shows the association of the pedal with a further modified type of accelerator rod.
Figure 16 is a transverse, sectional elevation take on the line 16—16 of Figure 15, looking in the direction of the arrows.
Figure 17 illustrates a modified form of pedal in association with a still further form of accelerator mechanism.

While the pedal as thus far described is of the form in which it would be applied to a majority of existing models of automobiles, it is desirable to make provision for adapting it to other styles sometimes met with in practice, and for this purpose the pedal when sold to the retail trade for replacement of existing accelerator devices is provided with a channel plate 43 detachably secured by screws 44 to the underside of plate 6. This channel plate is provided with a plurality of openings 45, 46, 47 in the parallel flange portions thereof. The provision of this channel plate is desirable for the reason that some accelerator rods, such as 17a of Figure 14, are adapted to be secured to the accelerator operating member by a pivot pin 48. The openings 45, 46 and 47 are of different sizes and are adapted to receive different pivot pins. As illustrated in Figure 14, the pedal is used in conjunction with an accelerator rod 17a having a pivot pin 48 of the smallest size, and hence the openings 45 are used.

This construction is also adapted to cooperate with another style of accelerator rod 17b, as seen in Figures 15 and 16. This accelerator rod 17b is provided with a horizontally extending end 17c which is adapted to be inserted through the aligned openings 46 and retained in associated relation with the channel plate 43 by a cotter pin 49. When it is desired to use the pedal with an accelerator rod such as 17 of Figure 1, the channel plate 43 is simply removed from the plate 6.

In Figure 17 disclosure is made of a modified form of the invention adapted to replace existing pedals pivoted not at the rear end as in the forms hereinbefore described, but at the forward end of the pedal. In such a construction a base 1d is secured over an opening 50 in a floor board 2d and ears 3d support a hinge pin 4d to which a crank 51 is connected. The lower end of the crank 51 is connected to a thrust rod 52 to thrust the rod forward when the crank is rocked in a counter-clockwise direction, as seen in Figure 17, and provision is made of a return spring 53 for pulling the rod 52 rearwardly. A pedal plate 6d is made fast to the hinge pin 4d by ears 11a. The plate 6d extends rearward and is curved downward to ex end at a convenient angle for engagement by the foot of the operator. A locking bar 19d is pivoted on the hinge pin 4d and is provided with an operating flange 21d extending above the plane of the operating portion of the plate 6d. Provision is made of a friction post 32d which cooperates with a friction plate 27d similar in construction and mounting to the plate 27 of Figure 1. The construction is generally similar to that of Figure 1, and hence the remaining parts shown in Figure 17 have been designated by corresponding reference numerals with the subscript "d", and further description of them is deemed unnecessary.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principle may be utilized.

We claim:

1. In combination, an accelerator rod extending upward through the floor board of a motor vehicle, and a pedal assembly for operating the same, comprising a base adapted for attachment to the floor board of the vehicle, a pedal pivoted on the base but substantially spaced from the base adjacent the pivot, an upstanding friction post carried by the base between the pivot and the accelerator rod and nearer to the pivot than to the accelerator rod, means carried by the pedal for cooperation with the friction post to lock the pedal frictionally against depression, and means normally movable with the pedal but operable relative thereto to operate the pedal carried friction means to locking position.

2. In combination, an accelerator rod extending upward through the floor board of a motor vehicle, and a pedal assembly for operating the same, comprising a base adapted for attachment to the floor board of the vehicle, a pedal pivoted on the base, an upstanding friction post carried by the base, a friction device cooperative therewith depending from the pedal, both the post and the friction device being of less height than the upper surface of the pedal adjacent the pivot and having their coacting portions situated nearer to the pivot than to the rod engaging portion of the pedal, and means normally movable with the pedal but operable relative thereto to operate the friction device to lock the pedal against depression.

3. In combination, an accelerator rod extending upward through the floor board of a motor vehicle, and a pedal assembly for operating the same, comprising a base adapted for attachment to the floor board of the vehicle, a pedal pivoted on the base, an upstanding friction post carried by the base, means carried by the pedal and operable at will by the operator into binding engagement with the friction post to lock the pedal against depression, and means for automatically unlocking said locking means upon the release thereof by the operator.

4. A pedal assembly for operating the accelerator mechanism of a motor, comprising a pedal, friction means operable to lock said pedal against depression, comprising a lock operating member normally movable with the pedal at a height slightly above the plane of the pedal but adapted upon depression toward or to the plane of the pedal to effect locking, the relation of the pedal and the lock operating member being such that relative movement of them is limited, and hence the locking force which may be applied is limited so that the pedal can be depressed when necessary, even against the maximum locking force which it is possible to apply.

5. A pedal assembly for operating the accelerator mechanism of a motor, comprising a pedal mounted for pivotal movement, friction means for locking the pedal against depression, a lock operating member, means maintaining the lock operating member during depression of the pedal normally in fixed relation to the pedal and above the plane thereof, the lock operating member projecting through the pedal at one side of the pedal and being operable to make the lock effective by depression toward the pedal, the relative movement of the lock operating member and the pedal being limited by the pedal.

6. A pedal assembly for operating the accelerator mechanism of a motor, comprising a pedal mounted for pivotal movement, friction means for locking the pedal against depression, a lock operating member depressible relative to the pedal to effect locking of the pedal, means for limiting upward movement of the lock operating member with said member projecting above the plane of the pedal, and means for resiliently urging the lock operating member to the upward limit of such movement, depression of the lock operating member relative to the pedal being limited by engagement of the foot of the operator with the portion of the pedal adjacent the lock operating member.

7. A pedal assembly for operating the accelerator mechanism of a motor, comprising a pedal, means for frictionally locking the pedal against depression, a locking member normally movable in fixed relation to the pedal but operable relative thereto to make the locking means effective, the pedal and the lock operating member being so related that only a limited relative movement is permitted, and means for adjusting the relationship of the lock operating member to the locking means to make the locking means effective in the desired relative position of the pedal and the lock operating member.

8. A pedal assembly for operating the accelerator mechanism of a motor, comprising a base, a pedal pivoted on the base, an upstanding friction post carried by the base, a friction plate pivotally carried by the pedal and embracing the post, said plate being formed to grip the post when rocked in one direction to oppose depression of the pedal and to release the post when rocked in the opposite direction to avoid opposing the rise of the pedal, means normally maintaining the friction plate in its non-gripping position, and a member normally movable in unison with the pedal but depressible relative thereto to rock the friction plate into position to grip the post.

9. A pedal assembly for operating the accelerator mechanism of a motor, comprising a base, a pedal pivoted on the base, an upstanding friction post carried by the base, a friction plate pivotally mounted on the pedal for rocking about an axis substantially at right angles to the axis of the pedal pivot, said plate embracing the post and being formed to grip the post when rocked in one direction to oppose depression of the pedal and to release the post when rocked in the opposite direction to avoid interference with the rise of the pedal, means normally maintaining the friction plate in its non-gripping position, and a member normally movable in unison with the pedal but depressible relative thereto to rock the friction plate into position to grip the post.

10. A pedal assembly for operating the accelerator of a motor, comprising a base, a pedal pivoted thereon, an upstanding friction post carried by the base, a friction locking member carried by the pedal for cooperation with the friction post to lock the pedal against depression, means normally maintaining the friction member in non-locking position, a lock operating member normally movable in fixed relation to the pedal but operable relative thereto to effect locking of the pedal, and an element carried by the lock operating member for engaging the friction locking member, said element being adjustable to various positions to cause the locking member to become effective at the desired point in the stroke of the lock operating member.

11. In a pedal assembly for operating the accelerator mechanism of a motor, in combination, a pedal, means for locking the pedal against depression, including a lock operating member normally maintained a little above the plane of the pedal, but depressible relative thereto to effect locking, and a cover of flexible material covering both the pedal and the lock operating member.

12. In a pedal assembly for operating the accelerator mechanism of a motor, in combination, a pedal of generally regular peripheral contour, but having an edge thereof provided with a recess, means for locking the pedal frictionally against depression, a lock operating member substantially co-extensive with said recess and normally positioned a little above the plane of the pedal, but depressible toward the pedal to effect locking, and means composed of flexible material forming a common cover for the pedal and the lock operating member.

13. In a pedal assembly for operating the accelerator mechanism of a motor, in combination, a pedal of generally regular contour, but having an edge thereof provided with a recess, means for locking the pedal frictionally against depression, a lock operating member operating through the recess, said member being normally maintained in fixed relation to the pedal a little above the plane of the pedal, and a cover of resilient, flexible material covering and embracing both the pedal and the lock operating member.

14. In combination, a crank connected to operate the accelerator mechanism of a motor, a pedal rigidly connected thereto, an upstanding friction post beneath the pedal, friction means carried by the pedal for cooperation with the friction post to lock the pedal against depression, and a lock operating member normally movable in fixed relation to the pedal, but operable relative thereto to effect locking.

15. The combination with an accelerator rod, of a motor vehicle, a fixed treadle support, a treadle overlying the accelerator rod and pivotally mounted on the support at a point remote from the accelerator rod, means for frictionally locking the treadle against depression situated wholly above the treadle support but wholly below the treadle, said locking means being normally ineffective, and a member carried by and normally movable with the treadle, but movable relatively to the treadle at will to render the treadle locking means effective.

16. In a motor vehicle, the combination with a floor board and an accelerator rod extending therethrough, of a treadle overlying said rod, a base attached to the floor board and supporting the treadle for pivotal movement about an axis remote from the rod and closely adjacent the floor board, means situated below the foot engaging surface of the treadle but wholly above the floor board for locking the treadle against depression, and means carried by the treadle and operable relatively thereto to make such locking means effective.

17. A combined accelerator pedal and foot rest attachment for a motor vehicle designed for securement in cooperative engagement with the accelerator rod thereof, comprising a treadle having a large undersurface adapted for cooperative engagement with the accelerator rod, a base adapted for attachment to the floor board of the vehicle to provide a pivotal supporting axis for the treadle adjacent the floor board and remote from the accelerator rod contacting area thereof, and cooperative members carried by the base and the treadle and including a treadle carried operating member, for locking the treadle against depression when desired, said cooperative members being situated entirely above the floor board but not extending substantially above the treadle.

18. A combined accelerator pedal and foot rest attachment for a motor vehicle designed for securement in cooperative engagement with the accelerator rod thereof, comprising a treadle having a large undersurface adapted for cooperative engagement with the accelerator rod, a base adapted for attachment to the floor board of the vehicle to provide a pivotal supporting axis for the treadle, and cooperative members carried by the base and the treadle and including a treadle carried operating member for locking the treadle against depression when desired, said cooperative members being situated entirely above the floor board but not extending substantially above the treadle.

In testimony whereof we have affixed our signatures to this specification.

GEORGE HEWLETT TOWNSEND.
CORD H. BEHNKE.